United States Patent
Kilty et al.

(10) Patent No.: US 6,825,146 B2
(45) Date of Patent: Nov. 30, 2004

(54) OLEFIN POLYMERIZATION CATALYST COMPOSITIONS AND METHOD OF PREPARATION

(75) Inventors: Peter A. Kilty, Sugar Land, TX (US); Thomas R. Cuthbert, Houston, TX (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 190 days.

(21) Appl. No.: 10/138,141

(22) Filed: May 1, 2002

(65) Prior Publication Data

US 2003/0064882 A1 Apr. 3, 2003

Related U.S. Application Data

(60) Provisional application No. 60/294,183, filed on May 29, 2001.

(51) Int. Cl.[7] ............................ C08F 4/654; C08F 4/649
(52) U.S. Cl. ................... 502/107; 502/115; 502/104; 502/116; 502/126; 502/127; 502/128; 526/124.3; 526/125.2; 526/125.3; 526/125.7
(58) Field of Search ............................... 502/107, 115, 502/104, 116, 126, 127, 128; 526/124.3, 125.2, 125.3, 125.7

(56) References Cited

U.S. PATENT DOCUMENTS

| | | | |
|---|---|---|---|
| 4,330,649 A | | 5/1982 | Kioka et al. |
| 4,442,276 A | | 4/1984 | Kashiwa et al. |
| 4,460,701 A | | 7/1984 | Terano et al. |
| 4,472,521 A | | 9/1984 | Band |
| 4,535,068 A | * | 8/1985 | Job .......................... 502/107 |
| 4,540,679 A | | 9/1985 | Arzoumanidis et al. |
| 4,547,476 A | | 10/1985 | Terano et al. |
| 4,548,915 A | | 10/1985 | Goodall et al. |
| 4,728,705 A | * | 3/1988 | Nestlerode et al. ...... 526/125.3 |
| 4,816,433 A | | 3/1989 | Terano et al. |
| 4,829,037 A | | 5/1989 | Terano et al. |
| 4,927,797 A | | 5/1990 | Ewen |
| 4,990,479 A | | 2/1991 | Ishimaru et al. |
| 5,028,671 A | | 7/1991 | Kioka et al. |
| 5,034,361 A | | 7/1991 | Job et al. |
| 5,066,737 A | | 11/1991 | Job |
| 5,066,738 A | | 11/1991 | Ewen |
| 5,077,357 A | * | 12/1991 | Job .......................... 526/119 |
| 5,082,907 A | | 1/1992 | Job |
| 5,082,987 A | | 1/1992 | Olbrich et al. |
| 5,093,415 A | * | 3/1992 | Brady et al. ................. 525/53 |
| 5,106,806 A | | 4/1992 | Job |
| 5,124,298 A | | 6/1992 | Job |
| 5,146,028 A | | 9/1992 | Job |
| 5,151,399 A | | 9/1992 | Job |
| 5,153,158 A | | 10/1992 | Kioka et al. |
| 5,229,342 A | | 7/1993 | Job |
| 5,247,031 A | | 9/1993 | Kioka et al. |
| 5,247,032 A | | 9/1993 | Kioka et al. |

FOREIGN PATENT DOCUMENTS

WO     WO 94/15977     7/1994

* cited by examiner

Primary Examiner—Roberto Rabago

(57) ABSTRACT

A method of making a solid procatalyst composition for use in a Ziegler-Natta olefin polymerization catalyst composition, said method comprising:

contacting a solid precursor composition comprising magnesium, titanium, and alkoxide moieties with a titanium halide compound and an internal electron donor in any order, in a suitable reaction medium to prepare a solid procatalyst composition, separating the solid procatalyst from the reaction medium, further exchanging residual alkoxide functionality of the solid procatalyst composition for chloride functionality by contacting the same two or more times with benzoyl chloride halogenating agent under metathesis conditions for a period of time sufficient to prepare a solid procatalyst composition having a decreased alkoxide content compared to the alkoxide content of the solid procatalyst composition before said exchange, and recovering the solid procatalyst composition.

17 Claims, No Drawings

OLEFIN POLYMERIZATION CATALYST COMPOSITIONS AND METHOD OF PREPARATION

CROSS REFERENCE STATEMENT

This application claims the benefit of U.S. Provisional Application No. 60/294,183, filed May 29, 2001, the teachings of which are incorporated herein by reference.

BACKGROUND OF THE INVENTION

The present invention relates to improved polymerization catalyst compositions of the Ziegler-Natta type, procatalysts for use in forming such catalyst compositions, methods of making such catalyst compositions and procatalysts, and to methods of using the catalyst compositions to make an olefin polymer.

Ziegler-Natta olefin polymerization catalyst compositions typically comprise a solid component containing magnesium, titanium and halide moieties in combination with an internal electron donor (which combination is referred to as the "procatalyst"), a substance that is capable of converting the procatalyst to an active polymerization catalyst (referred to as a "cocatalyst"), and a selectivity control agent (SCA) or external donor. Suitable internal electron donors especially include aromatic mono- or di-alkylesters or ether derivatives thereof, such as alkylbenzoates, dialkylphthalates, and $C_{1-4}$ alkyl ether derivatives thereof. Conventional cocatalysts include aluminum trialkyls, such as triethylaluminum or triisobutylaluminum. The cocatalyst may be combined or complexed with some or all of the internal electron donor, selectivity control agent, or both, if desired. Although variations in any of these catalyst components will influence the performance of the resultant catalyst, the component that appears to offer the greatest opportunity for modification to produce greater catalyst activity is the procatalyst.

Various methods of preparing procatalysts are previously disclosed in the patent art. Examples include: U.S. Pat. Nos. 5,247,032, 5,247,031, 5,229,342, 5,153,158, 5,151,399, 5,146,028, 5,124,298, 5,106,806, 5,082,907, 5,077,357, 5,066,738, 5,066,737, 5,034,361, 5,028,671, 4,990,479, 4,927,797, 4,829,037, 4,816,433, 4,728,705, 4,548,915, 4,547,476, 4,540,679, 4,535,068, 4,472,521, 4,460,701, 4,442,276, and 4,330,649. One preferred method from among the foregoing disclosures is a method of forming a "procatalyst precursor" from a mixture of magnesium dialkoxides and titanium alkoxides and reacting the mixture with titanium tetrachloride in the presence of an alcohol, an aromatic hydroxide compound, and an aromatic solvent, especially chlorobenzene. In this manner, a solid material is recovered by selective precipitation upon removal of alcohol from the solution. This precursor may thereafter by contacted with an internal electron donor and washed with $TiCl_4$ in a halohydrocarbon solvent to form the desired procatalyst. Among the foregoing disclosures, U.S. Pat. No. 5,124,298 and U.S. Pat. No. 5,082,907, disclose that an acid chloride, such as benzoyl chloride or phthaloyl chloride, may be used in combination with the $TiCl_4$ and a halohydrocarbon in at least one such wash step to further facilitate the replacement of at least a portion of the alkoxide moieties. In U.S. Pat. No. 4,535,068 benzoyl chloride was contacted with a magnesium alkoxide precursor compound both during preparation of a procatalyst and in a subsequent step. The reference stated that the benzoyl chloride contacting step may occur either before or simultaneously with halogenation by means of a tetravalent titanium halide.

SUMMARY OF THE INVENTION

According to the present invention, there is provided a method of making a solid procatalyst composition for use in a Ziegler-Natta olefin polymerization catalyst composition, said method comprising:

contacting a solid precursor composition comprising magnesium, titanium, and alkoxide moieties with a titanium halide compound and an internal electron donor in any order, in a suitable reaction medium to prepare a solid procatalyst composition, separating the solid procatalyst composition from the reaction medium, further exchanging residual alkoxide functionality of the solid procatalyst composition for chloride functionality by contacting the same two or more times with benzoyl chloride under metathesis conditions for a period of time sufficient to prepare a solid procatalyst composition having a decreased alkoxide content compared to the alkoxide content of the solid procatalyst composition before said exchange, and recovering the solid procatalyst composition.

Also included in the present invention are the solid procatalysts resulting from the foregoing methods of preparation; olefin polymerization catalysts comprising one or more of the foregoing procatalyst compositions, a cocatalyst, and optionally a selectivity control agent; an improved olefin polymerization process comprising contacting an olefin monomer under olefin polymerization conditions in the presence of the foregoing catalyst composition; as well as polyolefin polymers formed thereby.

The catalyst compositions of the present invention are useful in preparing α-olefin polymers having relatively high bulk density. Moreover, they enable the preparation of polypropylene impact copolymers, especially polypropylene that is impact modified by ethylene/propylene copolymers prepared in situ, having increased rubber contents, at elevated polymerization temperatures, without disadvantageous formation of polymer particle agglomerates.

DETAILED DESCRIPTION

All reference to the Periodic Table of the Elements herein shall refer to the Periodic Table of the Elements, published and copyrighted by CRC Press, Inc., 1999. Also, any reference to a Group or Groups shall be to the Group or Groups as reflected in this Periodic Table of the Elements using the IUPAC system for numbering groups. For purposes of United States patent practice, the contents of any patent, patent application or publication referenced herein are hereby incorporated by reference in their entirety herein, especially with respect to the disclosure of structures, synthetic techniques and general knowledge in the art. The term "comprising" when used herein with respect to a composition or mixture is not intended to exclude the additional presence of any other compound or component. The term "aromatic" or "aryl" refers to a polyatomic, cyclic, ring system containing $(4\delta+2)$ π-electrons, wherein δ is an integer greater than or equal to 1.

As mentioned above, the olefin polymerization procatalyst precursors employed in the invention comprise magnesium moieties. Sources for such magnesium moieties include anhydrous magnesium chloride, magnesium dialkoxides or aryloxides, or carboxylated magnesium dialkoxides or aryloxides. Preferred sources of magnesium moieties are magnesium di-$(C_{1-4})$alkoxides, especially diethoxymagnesium. Additionally the precursors comprise titanium moieties. Suitable sources of titanium moieties include titanium alkoxides, titanium aryloxides, and titanium halides. Preferred precursors comprise one or more magnesium di-($C_{1-4}$)-alkoxides and one or more titanium tetra-($C_{1-4}$)-alkoxides.

Various methods of making procatalyst precursor compounds are known in the art. These methods are described, inter alia, in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In a preferred method, the preparation involves chlorination of the foregoing mixed magnesium and titanium alkoxides, and may involve the use of one or more compounds, referred to as "clipping agents", that aid in forming specific compositions. Examples of suitable clipping agents include trialkylborates, especially triethylborate, phenolic compounds, especially cresol, and silanes.

A preferred procatalyst precursor for use herein is a mixed magnesium/titanium compound of the formula $Mg_d Ti(OR^e)_e X_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, preferably 2–4, most preferably 3; e is 2–12, preferably 6–10, most preferably 8; and f is 1–10, preferably 1–3, most preferably precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, with an alkanol, especially ethanol, and an inorganic chlorinating agent. Suitable inorganic chlorinating agents include chlorine derivatives of silicon, aluminum and titanium, especially titanium tetrachloride or titanium trichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. Any method of making, recovering and storing the solid precursor is suitable for use in the present invention.

One suitable method for converting the solid procatalyst precursor into a polymerization procatalyst is by reacting the precursor with a tetravalent titanium halide, an optional hydrocarbon or halohydrocarbon, and an electron donor (if not already present). The preferred tetravalent titanium halide is titanium tetrachloride.

The optional hydrocarbon or halohydrocarbon employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, alkylbenzenes, and the like. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene is particularly preferred.

Any electron donor can be used in the present invention so long as it is capable of converting the precursor into a procatalyst. Suitable electron donors are those electron donors free from active hydrogens that are conventionally employed in the formation of titanium-based procatalysts. Particularly preferred electron donors include ethers, esters, amines, imines, nitriles, phosphines, stibines, and arsines. The more preferred electron donors, however are carboxylic acid esters or ether derivatives thereof, particularly $C_{1-4}$ alkyl esters of aromatic monocarboxylic or dicarboxylic acids and $C_{1-4}$ alkyl ether derivatives thereof. Examples of such electron donors are methylbenzoate, ethylbenzoate, isopropylbenzoate, isobutylbenzoate, ethyl p-ethoxybenzoate, ethyl-p-methoxybenzoate, isopropyl-p-ethoxybenzoate, isobutyl-p-ethoxybenzoate, diethylphthalate, dimethylnaphthalenedicarboxylate, diisopropylphthalate, diisobutylphthalate, diisopropylterephthalate, and diisobutylterephthalate. The electron donor can be a single compound or a mixture of compounds, but preferably the electron donor is a single compound. Particularly preferred internal electron donors are: ethylbenzoate, ethyl p-ethoxybenzoate, di(n-butyl) phthalate, and di(isobutyl)phthalate.

In one embodiment of the invention, the electron donor may be formed in situ, by contacting the procatalyst precursor with an organic halogenating agent, especially benzoyl chloride or phthalyl dichloride, simultaneously with the foregoing precursor forming step or halogenation step using an inorganic halide compound (procatalyst forming step). Sufficient electron donor usually is provided or prepared in situ, so that the molar ratio of electron donor to the magnesium present in the solid procatalyst at this stage of the preparation is from about 0.01:1 to about 3:1, preferably from about 0.05:1 to about 2:1.

The manner in which the procatalyst precursor, the optional hydrocarbon or halohydrocarbon, the electron donor, and the chlorinating agent are contacted may be varied within wide limits. In one embodiment, the tetravalent titanium halide is added to a mixture of the electron donor and procatalyst precursor. More preferably however, the procatalyst precursor first is mixed with the tetravalent titanium halide and optional halohydrocarbon, and the electron donor is added last, after a period lasting from 10 to 30 minutes of precontact between the precursor and halogenating agent. Ideally, the contact time and temperature are controlled in order to obtain a solid product having a desired particle morphology. Preferred contacting times of the precursor with the remaining ingredients in the procatalyst composition forming process are at least 10, preferably at least 15 and more preferably at least 20 minutes, up to 1 hour, preferably up to 45 minutes, most preferably up to 35 minutes, at a temperature from at least 25, preferably at least 50, most preferably at least 60° C., to a temperature up to 100, preferably up to 90, most preferably up to 80° C. At combinations of higher temperatures or longer contacting times, particle morphology, especially particle size, size distribution and porosity of the resulting solid, procatalyst composition and the catalysts formed therefrom is adversely affected.

A preferred procatalyst for use herein is a mixed magnesium/titanium compound of the formula: $Mg_{d'}Ti(OR^e)_{e'}X_{f'}(ED)_{g'}$, wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an electron donor, especially ethylbenzoate; d' is 1 to 36, preferably 6–18, most preferably 10–14; e' is 0–3, preferably 0.01–2 most preferably 0.01–1; f' is 20–40, preferably 25–35, most preferably 27–29; and g' is 0.1–3, preferably 0.5–2.5, most preferably 1–2.

The next step according to the invention involves a multi-step, metathesis or exchange reaction with benzoyl chloride as an organic chlorinating agent in order to convert residual alkoxide moieties in the solid procatalyst to chloride moieties. Benzoyl chloride is the preferred metathesis reagent due to the fact that the alkyl benzoate which is formed as a by-product of the chlorination appears to be a more effective internal donor than are the alkyl phthalates, resulting in a more efficient polymerization catalyst. Desirably, the residual alkoxide content of the resulting solid, exchanged, procatalyst composition is 5 weight percent or less, more preferably 3 weight percent or less, most preferably 1 weight percent or less. The foregoing metathesis procedure is repeated at least one time (2 contactings total), preferably two times (3 contactings total), as desired until a suitable procatalyst composition is attained. Contacting with benzoyl chloride in at least two steps is preferred in order to achieve maximum catalyst efficiency. One or more of the previously mentioned halogenating agents, preferably $TiCl_4$, can be present in combination with the benzoyl chloride metathesis reagent, and preferably is present during at least the first and second contactings for best results.

The exchange process is desirably conducted at an elevated temperature from 45 to 120° C., preferably from 70 to 115° C., most preferably from 85 to 110° C., over a time period of from 10 minutes to 3 hours, preferably from 30 minutes to 90 minutes, most preferably from 40 to 80 minutes. After each of the foregoing exchanges, the solid, exchanged procatalyst composition is separated from the exchange mixture, desirably by filtration, and may be rinsed with a hydrocarbon, halohydrocarbon or halocarbon solvent, if desired. Such filtration step may occur over a time period from 10 minutes to 2 hours, preferably from 30 minutes to 100 minutes. It is generally preferred that all of the foregoing chlorination and exchange steps, including intervening filtrations or other form of recovery, and optional washings, occur without substantial cooling of the procatalyst composition. By substantial cooling is meant cooling by more than 25° C.

After the foregoing exchange procedure, the resulting solid, exchanged, procatalyst composition is separated from the reaction medium employed in the final process, preferably by filtering to produce a moist filter cake. The resulting filter cake may again be halogenated one or more times according to the previously disclosed procedure, if desired. The moist filter cake desirably is then rinsed or washed with a liquid diluent, preferably an aliphatic hydrocarbon to remove unreacted $TiCl_4$ and may be dried to remove residual liquid, if desired. Typically the solid, exchanged procatalyst composition is washed one or more times with an aliphatic hydrocarbon such as isopentane, isooctane, isohexane, hexane, pentane, or octane. The solid, exchanged, and optionally washed, procatalyst composition then can be separated and dried or slurried in a hydrocarbon, especially a relatively viscous, aliphatic hydrocarbon such as mineral oil for further storage or use.

The resulting solid, exchanged procatalyst composition is desirably in the form of porous particles. The resulting composition desirably corresponds to the formula: $Mg_{d''}Ti(OR^e)_{e''}X_{f''}(ED)_{g''}$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine; ED is an electron donor, especially ethylbenzoate; d" is 1 to 36, preferably 6–18, most preferably 10–14; e" is 0–2, preferably 0–1, most preferably 0–0.5; f" is 20–40, preferably 25–35 most preferably 27–29; and g" is 0.1–3, preferably 0.5–2.5, most preferably 1–2.

Desirably, the resulting solid, exchanged, procatalyst composition has the following particle physical properties as measured by BET, nitrogen porosimetry, and laser particle analyzer: an average surface area of at least 100 $m^2/g$, preferably at least 250 $m^2/g$, an average pore volume of at least 0.18 $cm^3/g$, preferably at least 0.20 $cm^3/g$, mean particle size from 20 to 40 $\mu m$, preferably from 24 to 30 $\mu m$, and particle size distribution having D10 from 3 to 15 $\mu m$, D50 from 18 to 30 $\mu m$ and D90 from 35 to 75 $\mu m$. This mean particle size is somewhat less than the mean particle size of a composition that has not been exchanged, and the distribution is somewhat narrower than a composition that is not subjected to the multi-step exchange process as disclosed herein.

Before, in combination with, or after being exchanged according to the present invention, the procatalyst composition may be further treated according to one or more of the following procedures. The solid procatalyst composition may be contacted (halogenated) with a further quantity of titanium halide compound, if desired; it may be substituted with a different halide salt compound or a complex thereof; it may be contacted (extracted) with a solvent, especially a halohydrocarbon; it may be rinsed or washed, heat treated; or aged. The foregoing techniques are previously known in the art with respect to different procatalyst compositions. The foregoing additional procedures may be combined in any order or employed separately, or not at all.

It is believed, without wishing to be bound by such belief, that further halogenating by contacting the previously formed procatalyst composition with a titanium halide compound, especially a dilute solution thereof in a halohydrocarbon diluent, results in desirable modification of the procatalyst composition, possibly by removal of certain inactive metal compounds that are soluble in the foregoing diluent. Accordingly, in a highly preferred embodiment of the present invention the exchange process is conducted in the presence of a titanium halide and a halohydrocarbon diluent, especially $TiCl_4$ and chlorobenzene. Highly desirably, the exchange utilizes a mixture of inorganic halogenating agent/diluent/exchange agent on a molar basis from 1/20–10,000/0.0001–0.1. Most preferably a mixture of $TiCl_4$/monochlorobenzene/benzoylchloride is used in a molar ratio range from 1/100–2000/0.001–0.01. The quantity of the foregoing exchange reagent (organic chlorinating agent) used with respect to the solid procatalyst (based on moles of Ti species in the procatalyst/moles exchange reagent) is from 1/1 to 1/100, preferably from 1/2 to 1/10.

Substitution refers to a process by which the procatalyst may be further modified by incorporation of a halide salt compound therein. Suitable halide compounds include those compounds that are capable of removing titanium species from the solid procatalyst material or adjusting the type or quantity of titanium species in the procatalyst composition without detrimentally affecting the resulting catalyst properties. It is preferred that the halide salt compound be soluble in the medium that contains the procatalyst or the precursor components. The halide salt compound (if different from the titanium compound used to prepare the present solid, procatalyst composition) may be employed by itself, or it may be complexed with another compound, such as an internal electron donor.

More than one halide salt compound may be used in the substitution process if desired. Suitable halide salt compounds for the foregoing substitution procedure include: $TiCl_4$, $ZrCl_4$, $VCl_4$, $WCl_6$, $VOCl_3$, $SnCl_4$, $SiCl_4$ and mixtures thereof. Soluble complexes of such metal halides complexed with the appropriate ligands, such as diisobutyl phthalate (DIBP), also may be used as well. Examples include $ZrCl_4(DIBP)$ and $VCl_4(DIBP)$. A preferred reagent is $TiCl_4$. If a complex of a metal salt is employed, it is desirable that some quantity of $TiCl_4$ be included in the substitution mixture. The presence of a small quantity of $TiCl_4$ in the substitution medium has desirably been found to reduce adverse affects caused by release of electron donor from the procatalyst composition during the substitution. The substitution step may be combined with the present exchange procedure, if desired.

In a further preferred embodiment, the solid procatalyst composition is extracted to remove non-active titanium halide species by exposure to a suitable diluent optionally at elevated temperature. One such process involves contacting the solid procatalyst, optionally additional electron donor, and an halohydrocarbon at an elevated temperature, for example, a temperature of up to about 150° C., for a period of time following the foregoing exchange. It is particularly preferred to conduct the extraction at a temperature greater than 45° C., preferably greater than 85° C., more preferably greater than 115° C., and most preferably greater than 120° C., to a temperature up to about 300° C., more preferably up to about 200° C., and most preferably up to about 150° C.

Best results are obtained if the materials are contacted initially at or about ambient temperature and then heated. Sufficient tetravalent titanium halide may be provided to further convert any residual alkoxide moieties of the procatalyst to halide groups at the same time as the extraction. The extraction process is conducted in one or more contacting operations, each of which is conducted over a period of time ranging from a few minutes to a few hours and it is preferred to have a halohydrocarbon present during each contacting.

Suitable extractants include aliphatic, cycloaliphatic, or aromatic hydrocarbons, halogenated derivatives thereof, and mixtures thereof. Exemplary aliphatic hydrocarbons include pentane, octane and the like. Exemplary cycloaliphatic hydrocarbons include cyclopentane, cyclohexane, cyclooctane, and the like. Exemplary aromatic hydrocarbons include benzene, alkylbenzenes, dialkylbenzenes, and the like. Exemplary halogenated derivatives of the foregoing include methylenechloride, methylenebromide, chloroform, carbon tetrachloride, 1,2-dibromoethane, 1,1,2-trichloroethane, trichlorocyclohexane, dichlorofluoromethane, tetrachlorooctane, chlorinated benzenes, bromobenzene, dichlorobenzene, chlorinated toluenes, and the like. Particularly preferred aliphatic hydrocarbons include pentane, isopentane, octane, and isooctane. Particularly preferred aromatic hydrocarbons include benzene, toluene, and xylene. Particularly preferred halohydrocarbons include carbon tetrachloride, 1,1,2-trichloroethane, chlorinated benzenes and chlorinated toluenes. Most highly preferred extractants are aromatic hydrocarbons and halohydrocarbons, especially toluene, xylene, ethylbenzene, chlorobenzene and dichlorobenzene. Desirably the extractant selected has a boiling point above the temperature used in the extraction so as to avoid the use of high pressure equipment.

The amount of extractant employed can be any effective amount capable of removing titanium species from the solid procatalyst. It is preferred that the extractant be used in an amount ranging from 0.1 to about 1000 milliliters per gram of solid procatalyst material. More preferably, the amount of extractant used ranges from about 1 to about 500 mL/g of solid procatalyst, and most preferably from about 5 to about 50 mL/g of solid procatalyst.

The amount of time the solid procatalyst material and the extractant are contacted is not critical so long as it is sufficient to remove undesired, soluble titanium species from the solid procatalyst material. There is no upper limit on the duration of contact from an efficacy standpoint, but economics typically play a role on the length of time the components will be contacted with one another. Preferably, the components are contacted from about 2 minutes to about 12 hours, more preferably from about 5 minutes to about 4 hours, and most preferably, from about 15 minutes to about 2 hours. Longer contact times and/or repeated extractions may be required if lower extraction temperatures or less efficient extractants are employed. The extraction may be conducted at any suitable pressure, but preferably atmospheric pressure or elevated pressures are employed.

Typically unextracted, solid, procatalysts have a titanium content anywhere from about 2.5 wt percent to about 6 wt percent, as determined by plasma emission spectroscopy. In contrast, an extracted, solid procatalyst of the present invention has from 5 up to 80 weight percent less titanium content, more preferably from 7 up to 75 weight percent less titanium, and most preferably, anywhere from 10 to about 70 weight percent less titanium content than a similarly prepared but unextracted composition. The extraction may be repeated any number of times with the same or varied reagents, concentrations of reagents, temperatures of reaction and time of reaction in order to achieve the desired titanium content of the solid procatalyst.

The solid, exchanged procatalyst composition serves as one component of a Ziegler-Natta catalyst composition, in combination with a cocatalyst and a selectivity control agent. The cocatalyst component employed in the Ziegler-Natta catalyst system may be chosen from any of the known activators of olefin polymerization catalyst systems employing a titanium halide, especially organoaluminum compounds. Examples include trialkylaluminum compounds and alkylaluminum halide compounds in which each alkyl group independently has from 1 to 6 carbon atoms. The preferred organoaluminum cocatalysts are triethylaluminum, triisopropylaluminum, and triisobutylaluminum. The cocatalyst is preferably employed in a molar ratio of aluminum to titanium of the procatalyst of from about 1:1 to about 150:1, but more preferably in a molar ratio of from about 10:1 to about 100:1.

The final component of the Ziegler-Natta catalyst composition (when used to polymerize $C_3$ and higher α-olefins) is the selectivity control agent (SCA), or external electron donor. Typical SCAs are those conventionally employed in conjunction with titanium-based Ziegler-Natta catalysts. Illustrative of suitable selectivity control agents are those classes of electron donors employed in procatalyst production as described above, as well as organosilane or polyorganosilane compounds containing at least one silicon-oxygen-carbon linkage. Suitable silicon compounds include those of the formula, $R^1{}_mSiY_nX_p$, or oligomeric or polymeric derivatives thereof, wherein: $R^1$ is a hydrocarbon radical containing from 4 to 20 carbon atoms, Y is —$OR^2$ or —$OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. Highly preferably, $R^1$ in at least one occurrence is not a primary alkyl group, and the non-primary carbon thereof is attached directly to the silicon atom. Examples of $R^1$ include cyclopentyl, t-butyl, isopropyl or cyclohexyl. Examples of $R^2$ include ethyl, butyl, isopropyl, phenyl, benzyl and t-butyl. Examples of X are Cl and H. Each $R^1$ and $R^2$ may be the same or different, and, if a polyatomic radical, substituted with any substituent which is inert under the reaction conditions employed during polymerization. Preferably, $R^2$ contains from 1 to 10 carbon atoms when it is aliphatic and may be a sterically hindered aliphatic- or a cycloaliphatic- group. When $R^2$ is aromatic it may have from 6 to 10 carbon atoms. Silicon compounds in which two or more silicon atoms are linked to each other by an oxygen atom, such as, siloxanes or polysiloxanes, may also be employed, provided the requisite silicon-oxygen-carbon linkage is also present.

The preferred selectivity control agents are alkyl esters of ring alkoxy- substituted aromatic carboxylic acids or dicarboxylic acids, especially ethyl p-methoxybenzoate or ethyl p-ethoxybenzoate (PEEB), or siloxane compounds, such as n-propyltrimethoxysilane, cyclohexylmethyldimethoxysilane, or dicyclopentyldimethoxysilane. In one embodiment of the invention the foregoing selectivity control agent may form at least a portion of the electron donor added during procatalyst production. In an alternate modification, the selectivity control agent is added only after formation of the procatalyst and may be added to a catalyst forming mixture or to an olefin polymerization mixture simultaneously or non-simultaneously with addition of the cocatalyst.

The selectivity control agent preferably is provided in a quantity of from 0.01 mole to about 100 moles per mole of titanium in the procatalyst. Preferred quantities of selectivity control agent are from about 0.5 mole to about 50 mole per mole of titanium in the procatalyst.

The olefin polymerization catalyst is produced by any suitable procedure of contacting the exchanged, solid procatalyst, the cocatalyst and the selectivity control agent. The method of contacting is not critical. The catalyst components or combinations thereof can be precontacted prior to polymerization to form a preactivated catalyst, or the components can be contacted simultaneously with contact with an olefin monomer. In one modification, the catalyst components simply are mixed in a suitable vessel and the preformed catalyst thereby produced is introduced into the polymerization reactor when initiation of polymerization is desired. In an alternate modification, the catalyst components are separately introduced into the polymerization reactor and the catalyst is formed in situ. In a final embodiment, the catalyst components may be introduced into one polymerization reactor and prepolymerized with one or more olefin monomers and subsequently contacted with additional olefin monomers, which may be the same or different from the olefin monomers used in the prepolymerization. The subsequent polymerization may take place in the same or in a different polymerization reactor and may include separate addition of one or more of the catalyst components during said subsequent polymerization.

The olefin polymerization catalyst may be used in slurry, liquid phase, gas phase or bulk, liquid monomer-type polymerization processes as are known in the art for polymerizing olefins, or in a combination of such processes. Polymerization preferably is conducted in a fluidized bed polymerization reactor, however, by continuously contacting an alpha-olefin having 3 to 8 carbon atoms with the three components of the catalyst system, that is, the solid procatalyst component, cocatalyst and SCAs. In accordance with the process, discrete portions of the catalyst components are continuously or semi-continuously fed to the reactor in catalytically effective amounts together with the alpha-olefin and any additional components, while the polymer product is continuously or semi-continuously removed therefrom. Fluidized bed reactors suitable for continuously polymerizing alpha-olefins have been previously described and are well known in the art. Suitable fluidized bed reactors useful for this purpose are described in U.S. Pat. Nos. 4,302,565, 4,302,566 and 4,303,771 and elsewhere.

It is preferred sometimes that such fluidized beds are operated using a recycle stream of unreacted monomer from the fluidized bed reactor. In this context, it is preferred to condense at least a portion of the recycle stream. Additionally, a liquid condensing agent may be included in the reaction mixture as well. The foregoing procedures are referred to as "condensing mode." Operating a fluidized bed reactor in condensing mode generally is known in the art and described in, U.S. Pat. Nos. 4,543,399 and 4,588,790, and elsewhere. The use of condensing mode has been found to be especially useful to increase catalyst activity, lower the amount of xylene solubles in isotactic polypropylene, and to improve overall catalyst performance when using catalysts prepared according to the present invention.

The precise procedures and conditions of the polymerization are broadly conventional but the olefin polymerization process, by virtue of the use therein of the polymerization catalyst formed from exchanged, solid procatalysts of the invention, provides a polyolefin product and particularly a polypropylene product having a relatively high bulk density in quantities that reflect the relatively high productivity of the olefin polymerization catalyst. Desirably, the bulk density of the resulting polymer ($\rho_{bd}$) as determined by gravimetric analysis is at least 0.33 g/cm$^3$, more preferably at least 0.35 g/cm$^3$. Increase in bulk density allows higher reactor capacity utilization or efficiency of operation, and accordingly is desired.

Moreover, the polyolefin product of the invention desirably allows for incorporation of enhanced rubber content when compared to rubber modified polyolefins, (especially ethylene/propylene rubber (EPR) modified isotactic polypropylene) made by a catalyst made from an unexchanged, but otherwise similar procatalyst, due, it is believed, to better dispersion of the rubber within the polyolefin matrix. Preferably, the rubber content of such polymers is capable of being increased 30 percent by weight, preferably at least 40 percent by weight over a similarly prepared catalyst composition that has not been exchanged as disclosed herein, at the same polymerization temperature, without significant increase in polymer agglomerate formation. Surprisingly, rubber modified polymers according to the invention containing high rubber contents of at least 40, preferably at least 45, and most preferably at least 50 weight percent may retain acceptable flow properties in the reactor under gas phase polymerization conditions resulting in less plugging of reactor components, thereby resulting in reduced levels of production or even shutting down of the reactor.

The xylene solubles content of the polyolefin products of the invention preferably are less than 5 weight percent, more preferably 2.5–4.5 weight percent. In addition, the polyolefin product preferably will contain reduced amounts of the catalyst residue. Preferably, the polymer will have a titanium content of less than about $1 \times 10^{-3}$ weight percent, more preferably less than $1 \times 10^{-4}$ weight percent, most preferably less than $5 \times 10^{-5}$ weight percent.

The polymerization product of the present invention can be any product, including homopolymers, copolymers, terpolymers, and the like. Usually, the polymerization product is a homopolymer such as polyethylene or polypropylene, particularly polypropylene. Alternatively and preferably for the reasons previously stated, the catalyst and process of the invention are useful in the production of copolymers including copolymers of ethylene and propylene such as EPR and polypropylene impact copolymers, such as EPR modified polypropylene, when two or more olefin monomers are supplied to the polymerization process. Those skilled in the art are capable of carrying out suitable polymerization of homopolymers, copolymers, terpolymers, or other product using liquid, slurry or gas phase reaction conditions, using the guidelines provided herein.

The invention is further illustrated by the following examples that should not be regarded as limiting of the present invention.

EXAMPLES

In the following examples, the following testing methods were used to determine the values reported in the tables. In the tables, a blank cell indicates that no data were taken for that particular portion of the experiment. The measurements of the mean diameters of the particles and the particle distribution were performed with a Malvern 1600™ laser granulometer, available from Malvern Corporation. The specific surface area (BET) was determined by the isothermal physical adsorption of nitrogen at the temperature of liquid nitrogen (S. Brunauer, P. H. Emmett, and E. Teller, Adsorption of gases in multimolecular layers, *J. Am. Chem. Soc.*, 60, 309 (1938)). The pore volume was determined by nitrogen absorption porosimetry. The measurements were performed after treatment of the samples under vacuum for 2 hours at room temperature.

Ti percent—percent titanium was determined by analyzing the catalysts using plasma emission spectroscopy.

Melt Flow was determined according to ASTM 1238, Condition L;

Bulk Density is apparent bulk density determined according to ASTM D1895-96;

Productivity—(kg of polymer per gram of procatalyst). Calculated by weighing the total amount of polymer produced and dividing by the total amount of procatalyst injected into the reactor.

XS—xylene solubles, unless indicated otherwise was measured by the $^{13}C$ NMR method as described in U.S. Pat. No. 5,539,309,or the gravimetric XS method of 21 CFR 177.1520. (Optionally the quantity of extracted polymer may be determined by measuring the refractive index of the extract, rather than weighing the residue after drying).

Example 1

A series of nine olefin polymerization procatalysts were prepared using a procatalyst precursor comprising magnesium, titanium, alkoxide and halide moieties. The precursor composition is prepared by reacting magnesium diethoxide, titanium tetraethoxide, and titanium tetrachloride, in a mixture of orthocresol, ethanol and chlorobenzene at a temperature of about 75° C. for about 2 hours. The solid reaction product is precipitated by removing ethanol from the solution (by heating to about 90° C.), washing with isopentane or isooctane and drying. The resulting dried, solid composition comprises primarily a compound of the empirical formula: $Mg_3Ti(OC_2H_5)_8Cl_2$.

This precursor composition was next converted to procatalyst compositions by contacting with $TiCl_4$ and ethylbenzoate electron donor. In each preparation, approximately 3.6 grams of the precursor was added to a 150 ml flask. A 50/50 volume mixture of $TiCl_4$ and chlorobenzene (65 ml) was added to the flask, followed by 0.4 ml of ethylbenzoate. The flask was heated in approximately 5 to 7 minutes to 70° C., and maintained at that temperature under constant agitation for 30 minutes. The resulting slurry was filtered through a fritted disc at the bottom of the flask, while maintaining the temperature at 70° C.

The resulting solid, procatalyst composition was next subjected to exchange and further halogenation by contacting with a mixture of $TiCl_4$, chlorobenzene, and benzoylchloride at 95° C. Specifically, 65 ml of an equal volume mixture of $TiCl_4$ and chlorobenzene was added to the flask containing the recovered procatalyst followed by 0.5 ml of benzoylchloride, and the mixture was rapidly heated to 95° C. The contents were maintained at that temperature for 60 minutes, and then filtered as before while retaining the recovered solids at 95° C. This exchange procedure was repeated once more under substantially identical conditions (specifically the benzoylchloride content was reduced to 0.4 ml). After filtering, the solids were cooled to about 25° C., washed three times with three 70 ml aliquots of isooctane, and dried in a stream of dry nitrogen for several hours. The resulting catalyst compositions have average BET surface area of 270 $m^2/g$, average pore diameter of 3.1 nm, and average pore volume 0.209 $cm^3/g$.

The resulting exchanged procatalyst compositions were tested for olefin polymerization activity by charging 0.70 mmoles of triethylaluminum cocatalyst, 0.35 mmoles ethyl p-ethoxybenzoate SCA, and 16.2 mg of the procatalyst composition into an autoclave reactor containing 1375 grams of liquid propylene and 13 mmole $H_2$ for one hour at 67° C. After venting and cooling of the polymerization reactor, the product was collected, dried in air, and weighed. Properties of the isotactic polypropylene product including loose bulk density and percent xylene solubles, along with activity of the catalyst, were measured and are displayed in Table 1.

TABLE 1

| Run | Polymer bulk density (g/cm$^3$) | Productivity (kg/g) | XS (percent) |
|---|---|---|---|
| 1 | 0.375 | 17.1 | — |
| 2 | 0.376 | 15.1 | 4.3 |
| 3 | 0.377 | 16.5 | 3.9 |
| 4 | 0.370 | 14.0 | 4.2 |
| 5 | 0.373 | 18.3 | 4.3 |
| 6 | 0.376 | 16.4 | 4.2 |
| 7 | 0.374 | 18.1 | 4.3 |
| 8 | 0.384 | 14.7 | 3.7 |
| 9 | 0.373 | 15.2 | 4.5 |
| Avg. | 0.375 | 16.2 | 4.2 |

Example 2

In a large scale preparation of procatalyst composition according to the invention, 6.9 $m^3$ of an equal volume of mixed $TiCl_4$ and chlorobenzene at 13° C. were pumped into a stainless steel heated pressure vessel equipped with a stirrer. Approximately 483 kg of a precursor composition prepared substantially according to the procedure of Example 1 was added, followed by about 8.6 liters of ethylbenzoate electron donor. The reactor was heated to 70° C. with stirring and held at that temperature for 40 minutes. The reactor contents were filtered over a period of 1 hour while maintaining a temperature of approximately 70° C.

The solid product was recovered and returned to the empty reaction vessel. A preheated (70° C.) mixture (50/50 by volume) of $TiCl_4$ and chlorobenzene (9 m³) was added followed by 10.7 liters of benzoylchloride. The mixture was stirred and allowed to heat to a final temperature of 93° C. over a period of 20 minutes, then filtered as before over a one hour period. The foregoing exchange with benzoylchloride was repeated a second time using slightly less benzoyl chloride (8.5 L).

The resulting solid, procatalyst composition (still at 93° C.) was rinsed with isopentane (10 m³) for about 2 hours while gradually reducing the temperature to ambient conditions (20° C.). Dry nitrogen at a temperature of about 45° C. was used to dry the catalyst cake over a period of 2 hours. After drying, the solid procatalyst composition was blended with mineral oil and used in preparation of olefin polymers. The resulting solid catalyst composition had similar average BET surface area, average pore diameter and average pore volume properties to those prepared in runs 1–9. Average particle size distribution data were as follows:

$D_{10}$=13.7 μm, $D_{50}$=25.0 μm, $D_{90}$=55.4 μm.

Polymerization Conditions:

Ethylene/propylene rubber modified polypropylene impact copolymers were prepared in twin, gas-phase olefin polymerization reactors operating in series. The reactors were each equipped with a distributor plate under which the fluidization gas was introduced. The gas exited the top of the fluidized bed and was conveyed through piping to a compressor and a cooler, which was used to control the temperature of the cycle gas, thereby controlling the temperature in the fluidized bed. After cooling, the cycle gas was then reintroduced below the distributor plate at a rate to maintain fluidization of the reactor contents. The first reactor contained propylene as the only olefin, hydrogen in a $H_2/C_3H_6$ molar ratio of about 0.03 (run 10) or 0.027 (run 11), and operating temperature of 66° C. The fluidized-bed reactor was operated under 430 psi, (3.08 MPa) total pressure with a propylene partial pressure of 340 psi (2.3 MPa). A superficial gas velocity of 1.2 ft/sec (0.36 m/sec) was used to fluidize the polymer bed weighing about 75 lbs (34 Kg) of polymer.

The catalyst slurry was metered with a syringe pump into a stream of 5 lbs/hr (2.3 kg/hr) of propylene, which conveyed the catalyst to the reactor. Solutions of triethylaluminum (TEAL) and ethyl p-ethoxybenzoate (SCA) were introduced separately into the reactor at locations on the recycle line to provide a molar ratio Al/Ti of 50:1 and Al/SCA of 2.1:1. Total SCA concentration in the reactor was maintained below about 250 ppm by weight.

After polymerization in the first reactor the polymeric product was passed to a second reactor operating under similar gas-phase polymerization conditions, excepting that additional catalyst and SCA were not added, the temperature was raised to 70° C., ethylene was added to the reactor to provide ethylene/propylene ratios of 0.79 (run 10) or 0.825 (run 11), an $H_2/C_3H_6$ ratio of 0.18 (run 10) or 0.09 (run 11), and a reactor pressure of 346 psi (2.4 MPa) with a propylene partial pressure of 140 psi (965 kPa) and an ethylene partial pressure of 111 psi (765 kPa) (run 10) or 115 psi (793 kPa) (run 11). Ethylene and propylene were added continuously during the polymerization. Results and polymer properties are contained in Table 2.

TABLE 2

| Run | Productivity (kg/g) | Melt flow (g/10 min) | Fc[1] | Ec[2] | Polymer bulk density (g/cm³)[3] | Flow Quality Index [4] |
|---|---|---|---|---|---|---|
| 10 | 9.3 | 3.7 | 16.5 | 62 | 0.341 | 0.87 |
| 11 | 10.0 | 1.75 | 28 | 62 | 0.328 | 0.78 |

[1]Weight percent rubber in the copolymer.
[2]Weight percent ethylene in the copolymer.
[3]Apparent bulk density, ASTM D1895–96.
[4]A measure of particle flowability determined by use of a Sotax ™ flow measuring instrument at 23 ° C., available from Sotax A.G., Basel, Switzerland. Qualitative flow ratings based on such values are: 0.9–1 = very good, 0.8–0.9 = good, 0.7–0.8 = satisfactory, 0.6–0.7 = marginal, 0.5–0.6= unsatisfactory, 0.4–0.5 = poor, 0.3–0.4 = very poor.

Example 3

The reaction conditions of Example 2 were substantially repeated employing reduced residence time in the first reactor in order to produce polymers containing higher rubber contents. Products having 40, 45 and 53 weight percent rubber and Flow Quality Index values of 0.68, 0.62 and 0.58, respectively, were prepared.

What is claimed is:

1. A method of making a solid procatalyst composition for use in a Ziegler-Natta olefin polymerization catalyst composition, said method comprising:

contacting a solid precursor composition comprising magnesium, titanium, and alkoxide moieties with a titanium halide compound and an internal electron donor in any order, in a suitable reaction medium to prepare a solid procatalyst composition, separating the solid procatalyst composition from the reaction medium, further exchanging residual alkoxide functionality of the solid procatalyst composition for chloride functionality by contacting the same two or more times with benzoyl chloride under metathesis conditions for a period of time sufficient to prepare a solid procatalyst composition having a decreased alkoxide content compared to the alkoxide content of the solid procatalyst composition before said exchange and without of the procatalyst composition by greater than 25° C., and recovering the solid procatalyst composition.

2. The method of claim 1 wherein the internal electron donor is a $C_{1-4}$ alkyl ester of an aromatic monocarboxylic or dicarboxylic acid, or a $C_{1-4}$ alkyl ether derivative thereof.

3. The method of claim 2 wherein the internal electron donor is ethylbenzoate, ethyl p-ethoxybenzoate, di(n-butyl) phthalate, or di(isobutyl)phthalate.

4. The method of claim 1 wherein each contacting of the exchange is conducted at a temperature from 45° C. to 120° C. for a time from 10 minutes to 3 hours.

5. The method of claim 1 wherein each contacting of the exchange is conducted at a temperature within the range of from 70° C. to about 115° C. for a time from 30 to 90 minutes.

6. The method of claim 5 wherein each contacting of the exchange takes place at a temperature within the range of from 85° C. to 110° C. for a time from 40 to 80 minutes.

7. The method of claim 1 wherein the solid procatalyst composition is contacted with benzoyl chloride three times.

8. The method of claim 1 where the solid procatalyst is also extracted one or more times with an inert diluent simultaneously or subsequently to said exchange.

9. The method of claim 1 wherein the solid procatalyst is contacted with a halide salt compound before or during the exchange step.

10. The method of claim 8 wherein the solid procatalyst is contacted with a halide salt compound before or during the exchange step.

11. A method of making a solid procatalyst composition for use in a Ziegler-Natta olefin polymerization catalyst composition, said method comprising:

precontacting a solid precursor composition comprising magnesium, titanium, and alkoxide moieties with a titanium halide compound and optionally a halohydrocarbon for a time from 10 to 30 minutes and thereafter contacting the mixture with an internal electron donor to prepare a solid procatalyst composition, separating the solid procatalyst composition from the reaction medium, further exchanging residual alkoxide functionality of the solid procatalyst composition for chloride functionality by contacting the same two or more times with benzoyl chloride under metathesis conditions for a period of time sufficient to prepare a solid procatalyst composition having a decreased alkoxide content compared to the alkoxide content of the solid procatalyst composition before said exchange, and recovering the solid procatalyst composition.

12. The method of claim 11 wherein the internal electron donor is a $C_{1-4}$ alkyl ester of an aromatic monocarboxylic or dicarboxylic acid, or a $C_{1-4}$ alkyl ether derivative thereof.

13. The method of claim 12 wherein the internal electron donor is ethylbenzoate, ethyl p-ethoxybenzoate, di(n-butyl) phthalate, or di(isobutyl)phthalate.

14. The method of claim 11 wherein the exchange is conducted without cooling of the procatalyst composition by greater than 25° C.

15. The method of claim 11 wherein each contacting of the exchange is conducted at a temperature within the range of from 85° C. to about 110° C. for a time from 40 to 80 minutes.

16. The method of claim 14 wherein each contacting of the exchange takes place at a temperature within the range of from 85° C. to 110° C. for a time from 40 to 80 minutes.

17. The method of claim 11 wherein the solid procatalyst composition is contacted with benzoyl chloride three times.

* * * * *